Patented Nov. 19, 1935

2,021,127

UNITED STATES PATENT OFFICE 2,021,127

PREPARATION OF ORGANIC ACIDS

Gilbert B. Carpenter, Wilmington, Del., assignor to E. I. du Pont de Nemours & Company, Wilmington, Del., a corporation of Delaware No Drawing. Application April 18, 1931,
Serial No. 531,260

11 Claims. (Cl. 260—116)

This invention relates to a process for the formation of organic compounds and particularly to the preparation of monocarboxylic acids by the interaction of aliphatic alcohols and carbon monoxide in the presence of a catalyst.

It is known that organic acids and esters can be prepared by the interaction, in the vapor or liquid phase, of organic compounds with the oxides of carbon. For example, it has been shown that by the condensation of methyl alcohol with carbon monoxide, in the presence of a suitable catalyst, acetic acid, methyl acetate, and methyl formate may be prepared in proportions which are governed by the particular operating conditions. Acids have likewise been prepared from methane and carbon dioxide, from carbon monoxide and water vapor, and from ethers and carbon monoxide. Investigators have experienced considerable difficulty in their attempts to find, for these reactions, a catalyst which under given operating conditions would produce a good yield of the acid or other compound desired. Some of the catalysts which have been suggested, include the hydrogenating and hydrating catalysts alone or in combination, metal acetate catalysts which split off acetic acid under 450° C., and acid catalysts, such as phosphoric acid and its acid salts.

There are numerous disadvantages in the employment of the before-mentioned catalysts, however. For instance, when the hydrogenating and hydrating catalysts are employed, particularly if acetic acid is the desired end product, but low yields of that acid result. With the metal acetate catalysts which decompose and split off acetic acid, frequent reactivation is required which renders their use uneconomical from the commercial standpoint. When the liquid acid catalysts are utilized, difficulties in supporting them and maintaining their initial activity are encountered.

An object of this invention is to provide a process for the preparation of higher molecular weight organic compounds thru the introduction of carbon monoxide into the lower molecular weight organic compounds. A further object of this invention is to provide a process for the preparation of monocarboxylic acids by the condensation of aliphatic alcohols with carbon oxides in the presence of a catalyst. Another object of this invention is to provide a process for the preparation of acids having the structural formulae $C_nH_{2n+1}COOH$ from alcohols having the structural formulae $C_nH_{2n+1}OH$ by subjecting the alcohols to the action of carbon monoxide in the presence of a chromic, molybdic, tungstic, or uranic acid catalyst. A still further object of this invention is to provide a process for the preparation of acetic acid by the interaction of methanol and carbon monoxide in the presence of one or more of the above acid catalysts and an absorbent oxide. Other objects will hereinafter appear.

I have found that the organic acids can be prepared by the interaction of the aliphatic alcohols in the presence of carbon monoxide by passing these vaporized alcohols together with the carbon monoxide over a catalyst comprising a simple acid of an element of group VI—A of the periodic table, viz. chromic, molybdic, tungstic, or uranic acid. Furthermore, I have found that when the reaction is conducted with one of these acid catalysts or mixtures thereof in conjunction with an adsorbent oxide such as silica gel, alumina gel, etc., or activated charcoal, an improved yield of the acid is obtained. In this application the term "simple acid" is used, not loosely, to include the oxides of these elements or complex acids of these elements with elements of other groups of the periodic table, but strictly to designate the simple acids, viz. $H_2CrO_4$, $H_2Cr_2O_7$, $H_2MoO_4$, $H_2WO_4$, etc.

The alcohol-carbon monoxide reactions which can be accelerated by the above described catalysts may be expressed as follows:

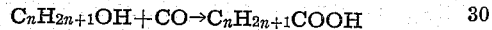
$$C_nH_{2n+1}OH + CO \rightarrow C_nH_{2n+1}COOH$$

In accordance with the particular operating conditions, it will be found that, in some instances, the acid may not be formed directly in the free state, but may be produced as an ester by condensation of the acid formed with the particular alcohol used in the process, as indicated below:

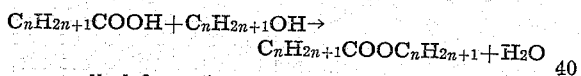
$$C_nH_{2n+1}COOH + C_nH_{2n+1}OH \rightarrow C_nH_{2n+1}COOC_nH_{2n+1} + H_2O$$

or an alkyl formate and, of course, products resulting from side reactions may be produced. The formation of the alkyl formates may be illustrated by this reaction:

$$C_nH_{2n+1}OH + CO \rightarrow HCOOC_nH_{2n+1}.$$

The alcohol used may be replaced, if desired, wholly or partly by the corresponding alkyl ethers of the alcohol, such as dimethyl ether, diethyl ether, or the mixed alkyl ethers, the alkyl esters, or other compounds containing one or more separate alkoxy groups.

The synthesis can generally be efficiently carried out under the following operating conditions. The pressure may vary from approximately 25 atmospheres to 900 atmospheres or higher with the preferable operating range in the neighborhood of 350–700 atmospheres. The temperature within the reaction zone is quite critical as it determines to a large extent the product obtained; the proportion of the esters or acids formed varying almost directly with the temperature. For example, when the methanol-carbon monoxide reaction is being conducted at low temperatures a preponderance of methyl formate over methyl acetate will be formed. While, on the other hand, at higher temperatures the methyl acetate will be produced in considerably greater proportions than the methyl formate and other side products. It will be apparent, therefore, that in accord with the type of product desired by controlling the temperature at that degree which most favors its formation, say, within the limits of 150 and 500° C., a preponderance of that product may be produced.

The carbon monoxide used may be obtained from various commercial sources, such, for example, as from water gas, producer gas, coke oven gas, and the like, but to obtain products of the highest degree of purity it is preferable to remove from such commercial gases the objectionable constituents such as sulfur compounds, metal carbonyls, etc.

The presence of inert gases in the alcohol-carbon monoxide mixture is sometimes desirable. Nitrogen, for instance, has little deleterious effect on the reaction or yield and, in fact, may be advantageously used in order to prevent too great a conversion of alcohol and carbon monoxide on one pass through the conversion apparatus. Other strictly inert gases will, usually, act similarly to nitrogen. It is, of course, understood that instead of introducing methanol itself into the reaction chamber substances or mixtures of substances which decompose to form alcohols or esters may be employed, but generally I prefer to introduce synthetic methanol directly into the gas stream leading to the converter.

My process can be conveniently carried out by passing purified carbon monoxide into methanol, preferably containing water, maintained at such a temperature that the issuing gases will have the requisite proportion of methanol, carbon monoxide and water vapor. I have found that a gaseous composition, containing an excess of carbon monoxide over the methanol vapor, will give a good yield of acetic acid and ester on one pass through a converter containing my catalyst,—the temperature of the reaction chamber being maintained at approximately 300° C. and the pressure held in the neighborhood of 700 atmospheres.

Not only can methanol be catalyzed in the presence of carbon monoxide and my catalyst to acetic acid or the condensation product of the acetic acid with methanol, i. e. methyl acetate, but the higher alcohols, such as ethyl alcohol, propyl alcohol, butyl alcohol, and even the higher molecular weight alcohols, such for example as hexyl alcohol or octyl alcohol, may be similarly converted into an acid having correspondingly one more carbon atom than the alcohol treated. In fact, my process and catalyst may be employed with any of the monohydric alcohols, providing these alcohols volatilize without decomposition. While converting the higher aliphatic alcohols, some of which are not water soluble, and particularly if water is desired in the reaction, it is preferable to introduce the alcohol and water into the carbon monoxide as a vapor or spray. Any other suitable procedure may be employed, however, for intimately commingling the vapors of the alcohol and water with the oxide of carbon. When preparing products from the higher molecular weight compounds I may utilize in lieu of the alcohol the ether or ester thereof, the use of which will modify, to some extent, the type of product obtained.

I will now describe specific embodiments of my process, but it will be understood that the details therein given and the compounds employed, either as reactants or catalysts, in no way restrict the scope of this invention, but merely illustrate one manner in which my process may be carried out.

*Example 1.*—A gaseous mixture, containing 95% carbon monoxide, and 5% methanol is passed over a chromic acid catalyst at a temperature of 250° C. and a pressure of 700 atmospheres. The catalyst may be prepared by absorbing an aqueous chromic acid solution on a suitable support such as pumice, or other inert material, and after drying at a temperature of approximately 125° C. admixing an adsorbent oxide such as silica gel, therewith. The acetic acid formed is removed from the reaction products by condensation.

*Example 2.*—A gaseous mixture containing 95% carbon monoxide and 5% methanol was passed over a tungstic acid catalyst at a temperature of 350° C. and a pressure of 700 atmospheres. The liquid condensate obtained from the converted gases contained 25½% acetic acid and 13% methyl acetate.

The apparatus, which may be employed for conducting these reactions, may be of any conventional type and preferably one in which the temperature of the exothermic reaction can be readily controlled at the optimum value. Owing to the corrosive action of acetic acid, the interior of the converter and apparatus leading therefrom should preferably be protected. This may be accomplished by using glass or glass-lined apparatus or by plating the inner surfaces thereof with chromium or silver or using for the construction of this equipment acid resisting high alloy steels containing, for example, high molybdenum, cobalt, tungsten, chromium, manganese, or nickel content.

From a consideration of the above specification it will be realized that any process in which a carbon oxide is combined with an organic compound giving a product containing a negative radical of an aliphatic acid, and particularly those in which monohydric alcohols are converted to monocarboxylic acids, will come within the scope of this invention when such reactions are accelerated in the presence of an acid catalyst as hereinbefore described.

I claim:

1. In a process for the preparation of aliphatic organic acids from carbon monoxide and an aliphatic oxygen-containing compound selected from the group consisting of monohydroxy aliphatic alcohols and compounds containing an alkoxy group, the step which comprises effecting the reaction in the presence of a catalyst containing a simple acid consisting of the elements hydrogen, oxygen, and a metal of group VI—A of the periodic table.

2. In a process for the preparation of aliphatic organic acids from a gaseous mixture containing carbon monoxide and an aliphatic oxygen-containing compound selected from the group consisting of monohydroxy aliphatic alcohols and compounds containing an alkoxy group, the step which comprises contacting the gaseous mixture with a catalyst containing a simple acid consisting of the elements hydrogen, oxygen, and a metal of group VI—A of the periodic table.

3. In a process for the preparation of saturated monocarboxylic aliphatic organic acids the step which comprises contacting a compound selected from the group consisting of monohydroxy aliphatic alcohols, and compounds containing an alkoxy group, and carbon monoxide with a catalyst containing a simple acid consisting of the elements hydrogen, oxygen, and a metal of group VI—A.

4. In a vapor phase process for the preparation of saturated monocarboxylic aliphatic organic acids the step which comprises contacting an aliphatic alcohol which is not substantially decomposed when vaporized and carbon monoxide with a catalyst containing a simple acid consisting of the elements hydrogen, oxygen, and a metal of group VI—A.

5. In a process for the preparation of acetic acid the step which comprises contacting methanol and carbon monoxide with a catalyst containing a simple acid consisting of the elements hydrogen, oxygen, and a metal of group VI—A.

6. In a process for the preparation of acetic acid the step which comprises contacting methanol and carbon monoxide with a catalyst containing a simple acid consisting of the elements hydrogen, oxygen, and a metal of group VI—A, supported on silica gel.

7. In a process for the preparation of acetic acid the step which comprises effecting the reaction between methanol and carbon monoxide to form acetic acid in the presence of a catalyst containing a simple acid consisting of the elements hydrogen, oxygen, and a metal of group VI—A.

8. In a process for the preparation of acetic acid the step which comprises effecting the interaction of methanol and carbon monoxide in the presence of a chromic acid catalyst supported on silica gel.

9. In a process for the preparation of acetic acid the step which comprises passing methanol and carbon monoxide over a simple acid consisting of the elements hydrogen, oxygen and chromium.

10. In a process for the preparation of acetic acid the step which comprises passing methanol and carbon monoxide over a simple acid consisting of the elements hydrogen, oxygen and tungsten.

11. In a process for the preparation of acetic acid the step which comprises passing methanol and carbon monoxide over a simple acid consisting of the elements hydrogen, oxygen and molybdenum.

GILBERT B. CARPENTER.